(12) United States Patent
Fanetti

(10) Patent No.: US 10,462,853 B2
(45) Date of Patent: Oct. 29, 2019

(54) INDUCTION PRE-HEATING AND BUTT WELDING DEVICE FOR ADJACENT EDGES OF AT LEAST ONE ELEMENT TO BE WELDED

(71) Applicant: ILLINOIS TOOL WORKS INC., Glenview, IL (US)

(72) Inventor: Marco Fanetti, Campagnola Cremasca (IT)

(73) Assignee: Illinois Tool Works Inc., Glenview, IL (US)

( * ) Notice: Subject to any disclaimer, the term of this patent is extended or adjusted under 35 U.S.C. 154(b) by 696 days.

(21) Appl. No.: 14/779,526

(22) PCT Filed: May 21, 2014

(86) PCT No.: PCT/US2014/038979
§ 371 (c)(1),
(2) Date: Sep. 23, 2015

(87) PCT Pub. No.: WO2014/193714
PCT Pub. Date: Dec. 4, 2014

(65) Prior Publication Data
US 2016/0073452 A1   Mar. 10, 2016

(30) Foreign Application Priority Data

May 28, 2013   (IT) .............................. TO2013A0430

(51) Int. Cl.
*H05B 6/10* (2006.01)
*B23K 28/00* (2006.01)
(Continued)

(52) U.S. Cl.
CPC ............. *H05B 6/101* (2013.01); *B23K 9/235* (2013.01); *B23K 13/02* (2013.01); *B23K 26/60* (2015.10);
(Continued)

(58) Field of Classification Search
CPC ........ B23K 26/60; B23K 9/235; B23K 13/02; B23K 28/02; B23K 2201/18;
(Continued)

(56) References Cited

U.S. PATENT DOCUMENTS 1,391,085 A   9/1921   Wendell
2,416,047 A   2/1947   Dolan
(Continued)

FOREIGN PATENT DOCUMENTS

CN   1917970       2/2007
CN   101213318    7/2008
(Continued)

OTHER PUBLICATIONS

International Search Report from PCT application No. PCT/US2014/038979, dated Sep. 24, 2014, 8 pgs.

*Primary Examiner* — Quang T Van
(74) *Attorney, Agent, or Firm* — McAndrews, Held & Malloy, Ltd.

(57) ABSTRACT

Device (1) including a head (5) for induction pre-heating the adjacent edges of at least one item requiring welding which have to be joined, in which a sliding-block-shaped supporting structure (8) capable of moving above the edges to be welded (2, 3) and parallel thereto carries a first U-shaped inductor (9) in a first plane parallel to a plane containing the edges which have to be welded and carries a second inductor (14) which is U-shaped in a second plane perpendicular to the first plane in such a way that a first and second branch (16, 17) respectively of a tube (15) of the second inductor (14) are placed between the edges which have to be welded, at a predetermined distance (K) from the first inductor (9), when in use.

17 Claims, 4 Drawing Sheets

(51) Int. Cl.
   *B23K 9/235* (2006.01)
   *B23K 13/02* (2006.01)
   *B23K 28/02* (2014.01)
   *B23K 26/60* (2014.01)
   *B23K 101/06* (2006.01)
   *B23K 101/18* (2006.01)
   *B23K 103/02* (2006.01)

(52) U.S. Cl.
   CPC .......... *B23K 28/02* (2013.01); *B23K 2101/06* (2018.08); *B23K 2101/18* (2018.08); *B23K 2103/02* (2018.08)

(58) Field of Classification Search
   CPC ............ B23K 2203/02; B23K 2201/06; B23K 9/1006; B23K 9/32; H05B 6/101
   USPC .... 219/615, 100, 108, 117.1, 61.2, 61, 60 R, 219/607, 608, 617, 660, 673, 57, 633, 219/635; 138/171
   See application file for complete search history.

(56) References Cited

U.S. PATENT DOCUMENTS

| | | | |
|---|---|---|---|
| 2,582,955 A | 1/1952 | Body | |
| 2,672,544 A | 3/1954 | Finchelstein | |
| 2,749,423 A | 6/1956 | Bisterfeld | |
| 2,753,427 A | 7/1956 | Yenni | |
| 2,829,229 A | 4/1958 | Metz | |
| 3,256,417 A | 6/1966 | Merrett | |
| 3,288,982 A | 11/1966 | Haruyoshi | |
| 3,414,698 A | 12/1968 | Bedford | |
| 3,520,053 A | 7/1970 | Hinton | |
| 3,612,806 A | 10/1971 | Lewis | |
| 3,619,548 A | 11/1971 | Cavagnero | |
| 3,659,069 A | 4/1972 | Balzer | |
| 3,840,138 A * | 10/1974 | Mohr ................ B21D 51/2676 219/635 |
| 3,842,234 A | 10/1974 | Seyfried | |
| 4,123,305 A | 10/1978 | Krzeszowski | |
| 4,523,269 A | 6/1985 | Baker | |
| 4,549,057 A | 10/1985 | Anderson | |
| 4,632,366 A | 12/1986 | Sprung | |
| 4,673,784 A | 6/1987 | Vickers | |
| 4,690,553 A | 9/1987 | Fukamizu | |
| 4,709,569 A | 12/1987 | Sabroff | |
| 4,874,916 A | 10/1989 | Burke | |
| 4,906,805 A | 3/1990 | Rudd | |
| 5,025,125 A | 6/1991 | Peterson | |
| 5,266,764 A | 11/1993 | Fox | |
| 5,313,037 A | 5/1994 | Hansen | |
| 5,319,179 A | 6/1994 | Joecks | |
| 5,329,085 A | 7/1994 | Cowell | |
| 5,343,023 A | 8/1994 | Geissler | |
| 5,365,041 A * | 11/1994 | Shank .................. C09J 5/06 156/380.2 |
| 5,450,305 A | 9/1995 | Boys | |
| 5,461,215 A | 10/1995 | Haldeman | |
| 5,630,958 A | 5/1997 | Stewart | |
| 5,686,006 A | 11/1997 | Gaspard | |
| 5,690,851 A | 11/1997 | Yoshioka | |
| 5,708,253 A | 1/1998 | Bloch | |
| 5,821,504 A | 10/1998 | Sprenger | |
| 6,043,471 A | 3/2000 | Wiseman | |
| 6,137,093 A | 10/2000 | Johnson | |
| 6,147,336 A | 11/2000 | Ushijima | |
| 6,162,509 A | 12/2000 | Cherico | |
| 6,229,127 B1 | 5/2001 | Link | |
| 6,265,701 B1 | 7/2001 | Bickel | |
| 6,333,484 B1 | 12/2001 | Foster | |
| 6,365,236 B1 | 4/2002 | Maloney | |
| 6,509,555 B1 | 1/2003 | Riess | |
| 6,794,622 B1 | 9/2004 | Alveberg | |
| 6,861,617 B2 | 3/2005 | Dull | |
| 6,875,966 B1 | 4/2005 | Barber | |
| 7,015,439 B1 | 3/2006 | Thomas | |
| 7,156,277 B2 | 1/2007 | Ishikawa | |
| 7,202,450 B2 | 4/2007 | Barber | |
| 7,696,458 B2 | 4/2010 | Thomas | |
| 7,786,415 B2 | 8/2010 | Thomas | |
| 7,922,812 B2 | 4/2011 | Ciulik | |
| 8,115,147 B2 | 2/2012 | Thomas | |
| 8,383,978 B2 * | 2/2013 | Fukutani ............ B23K 13/025 138/171 |
| 8,695,375 B2 | 4/2014 | Kirkwood | |
| 2001/0024152 A1 | 9/2001 | Miyazaki | |
| 2004/0069774 A1 | 4/2004 | Markegard | |
| 2004/0226940 A1 | 11/2004 | Monda | |
| 2005/0000959 A1 | 1/2005 | Kagan | |
| 2005/0103437 A1 | 5/2005 | Carroll | |
| 2006/0237448 A1 | 10/2006 | Barber | |
| 2006/0289492 A1 | 12/2006 | Thomas | |
| 2006/0289493 A1 | 12/2006 | Thomas | |
| 2006/0289495 A1 | 12/2006 | Thomas | |
| 2007/0023422 A1 | 2/2007 | Obata | |
| 2007/0284419 A1 | 12/2007 | Matlack | |
| 2008/0029507 A1 | 2/2008 | Barber | |
| 2008/0251642 A1 | 10/2008 | Boschet | |
| 2009/0072143 A1 | 3/2009 | Ishida | |
| 2009/0107991 A1 | 4/2009 | Mortimer | |
| 2009/0134133 A1 | 5/2009 | Mokadem | |
| 2009/0188910 A1 | 7/2009 | McDonnell | |
| 2009/0205453 A1 | 8/2009 | Oyekanmi | |
| 2009/0255925 A1 | 10/2009 | Chirico | |
| 2009/0256349 A1 | 10/2009 | Strubin | |
| 2010/0295412 A1 | 11/2010 | Matsumoto | |
| 2011/0011750 A1 | 1/2011 | Lovens | |
| 2011/0210110 A1 | 9/2011 | Dearman | |
| 2011/0284527 A1 | 11/2011 | Holverson | |
| 2012/0154101 A1 | 6/2012 | Miyashita | |
| 2014/0231415 A1 | 8/2014 | Verhagen | |

FOREIGN PATENT DOCUMENTS

| | | |
|---|---|---|
| CN | 101491856 | 7/2009 |
| DE | 2544790 | 4/1977 |
| DE | 10047492 A1 | 4/2002 |
| DE | 20319657 | 4/2005 |
| DE | 102005057476 | 8/2007 |
| DE | 102013104548 | 3/2014 |
| DE | 102012007959 | 8/2015 |
| EP | 0525621 | 2/1993 |
| EP | 1149653 | 10/2001 |
| EP | 2210695 | 7/2010 |
| EP | 2620512 | 7/2013 |
| FR | 2823459 | 10/2002 |
| GB | 1530308 | 2/1969 |
| GB | 1460140 | 12/1976 |
| GB | 2192294 | 1/1988 |
| GB | 2325982 | 12/1998 |
| GB | 2463694 A | 3/2010 |
| JP | 06015447 | 1/1994 |
| JP | H0740051 | 2/1995 |
| JP | 2001242015 | 9/2001 |
| RU | 2077415 | 4/1997 |
| RU | 2098247 | 12/1997 |
| RU | 2125310 | 1/1999 |
| WO | 0130117 | 4/2001 |
| WO | 2008010833 | 1/2008 |
| WO | 2010002269 | 1/2010 |
| WO | 2012006674 | 1/2012 |

\* cited by examiner

INDUCTION PRE-HEATING AND BUTT WELDING DEVICE FOR ADJACENT EDGES OF AT LEAST ONE ELEMENT TO BE WELDED

CROSS REFERENCE TO RELATED APPLICATIONS

This application claims priority from and the benefit of PCT Patent Application No. PCT/US2014/038979, filed on May 21, 2014, entitled "INDUCTION PRE-HEATING AND BUTT WELDING DEVICE FOR ADJACENT EDGES OF AT LEAST ONE ELEMENT TO BE WELDED"; and Italian Patent Application No. TO2013A000430, filed on May 28, 2013, entitled "DISPOSITIVO PER IL PRE-RISCALDAMENTO AD INDUZIONE E LA SALDATURA TESTA A TESTA DI LEMBI ADIACENTI DI ALMENO UN ELEMENTO DA SALDARE", both of which are herein incorporated by reference in their entireties.

This invention relates to a device for the induction pre-heating and butt welding of adjacent edges which need to be joined in at least one item requiring welding (for example defined by the terminal edges of a curved sheet when forming a tubular element or by the opposite edges of a pair of adjacent sheets), in particular when the edges which have to be joined are of considerable thickness. The invention also relates to an induction pre-heating head which can be used in such a device.

Welding systems which use induction pre-heating of the edges which are to be welded are known for example from U.S. Pat. No. 6,265,701B1 and US2011/0284527 by the same applicant. In these systems an induction pre-heating head heats the edges which have to be welded to a predetermined temperature and is moved in tandem along a welding path together with a conventional welding head, for example a TIG head or any other known type, which "follows" the pre-heating head.

Systems of this type are satisfactory. However, it has been found that induction pre-heating heads are unable to heat the edges which have to be welded to an optimum temperature over their entire thickness, in particular if the edges which have to be welded are of relatively great thickness, except at the price of excessive energy consumption and undesired heating of the items which have to be welded. In addition to this the pre-heating head is generally of large dimensions.

One object of this invention is to overcome the disadvantages in the known art by providing a device for the induction pre-heating and butt welding of adjacent edges which have to be joined in at least one item requiring welding, which is compact and efficient.

This invention therefore relates to a device for the induction pre-heating and butt welding of adjacent edges which need to be joined in at least one item which has to be welded as defined in claim 1.

The invention also relates to an induction pre-heating head for the abovementioned device according to claim 11.

The device according to the invention comprises an induction pre-heating head for the adjacent edges which have to be welded and a welding head located in tandem with respect to the pre-heating head immediately downstream from the pre-heating head in a welding direction along which the pre-heating and welding heads are moved along a welding path when in use. The pre-heating head comprises a supporting structure in the form of a sliding block which can move over the edges which have to be welded, parallel to them, and a first inductor at least partly defined by a first tube, this first inductor being U-shaped in a first plane parallel to a plane containing the edges which have to be welded, and is supported as an integral part by the supporting structure in such a way that first and second branches respectively of the first tube are each located above one of the edges which have to be welded at a predetermined distance from the edges which have to be welded when in use.

According to the principal aspect of the invention the pre-heating head also comprises a second inductor at least partly defined by a second tube, this second inductor being U-shaped in a second plane perpendicular to the first plane, and is supported as an integral part by the supporting structure in such a way that when in use first and second branches respectively of the second tube are located between the edges which have to be welded, at a predetermined distance from the first inductor.

The second inductor is cantilevered out from the supporting structure, from a first face which faces the edges which have to be welded when in use, and across the supporting structure itself; in particular the second inductor is supported by a first bracket mounted on a second face of the supporting structure opposite the first face and the device according to the invention also comprises means for adjusting the predetermined distance between the second inductor and the first inductor and means for centering the second inductor with respect to the edges which have to be welded, so as to maintain the second inductor equidistant from both the edges which have to be welded at all times when in use.

Finally the sliding block supporting structure directly carries a corresponding independent converter for each inductor on a face opposite the inductors and the edges which have to be welded, and the inductors are cantilevered out from the corresponding cylindrically shaped bodies of the converters, these bodies being supported as an integral part with the supporting structure. In addition to this the first and second branches of each inductor are provided with flow concentrators straddling the first and second tubes.

In this way an extremely compact and efficient pre-heating head which is easy to assemble and maneuver and which makes it possible to bring about uniform induction heating of the adjacent edges which have to be welded is obtained, while at the same time keeping the heating extremely localised to the edges alone, even in the case where the edges which have to be welded are of a thickness (measured perpendicular to the plane parallel to that in which the first inductor lies) which is relatively great, thus improving the welding which can be achieved, rendering it more reliable and at the same time reducing energy consumption.

Further features and advantages of this invention will be clearly apparent from the following description of a preferred embodiment provided below purely by way of a non-limiting example with reference to the appended drawings, in which.

Figure 3:
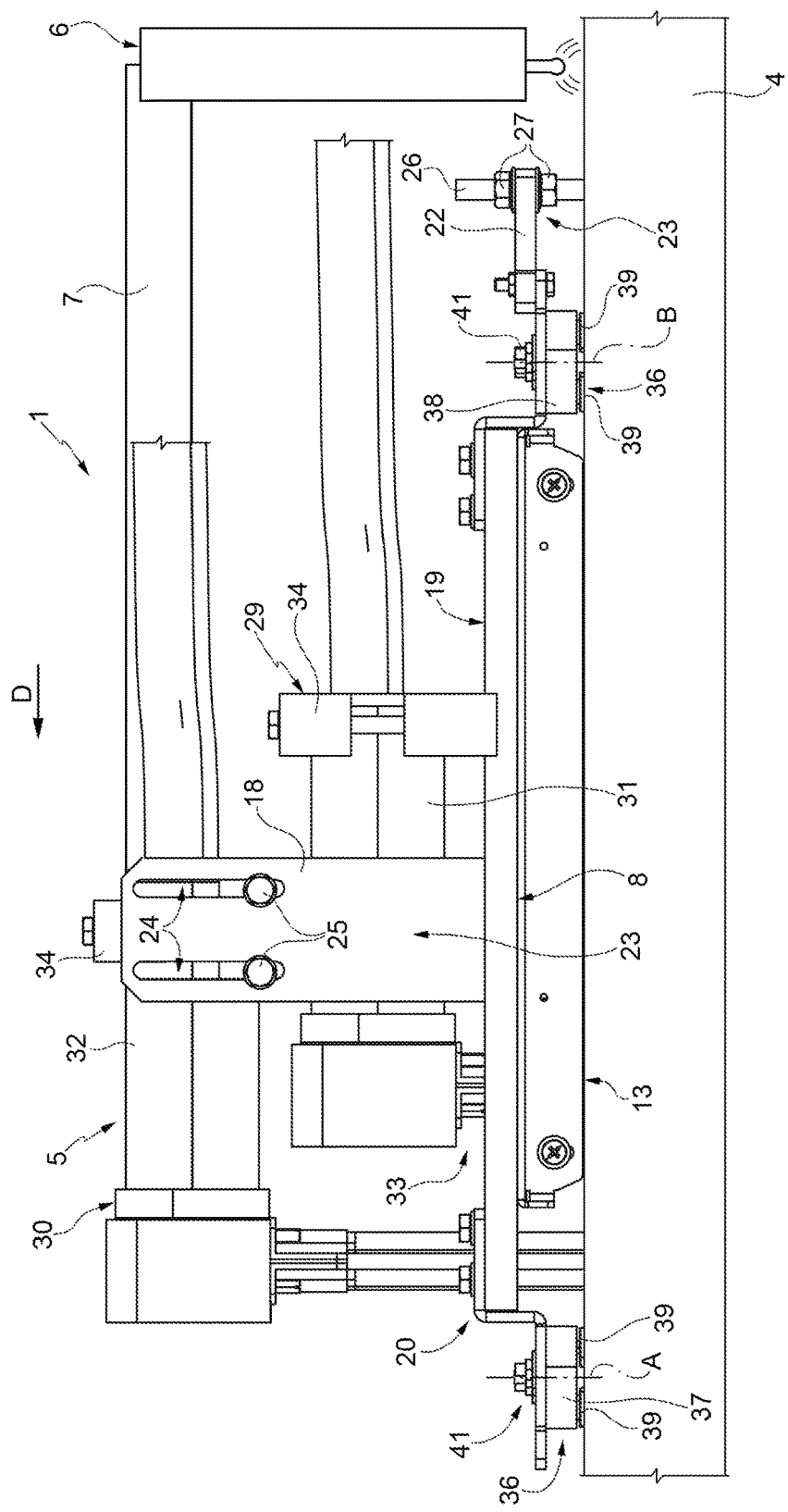

FIG. 3 diagrammatically illustrates a longitudinal right-angled view of the pre-heating and welding device according to the invention in elevation, an.

Figure 2:
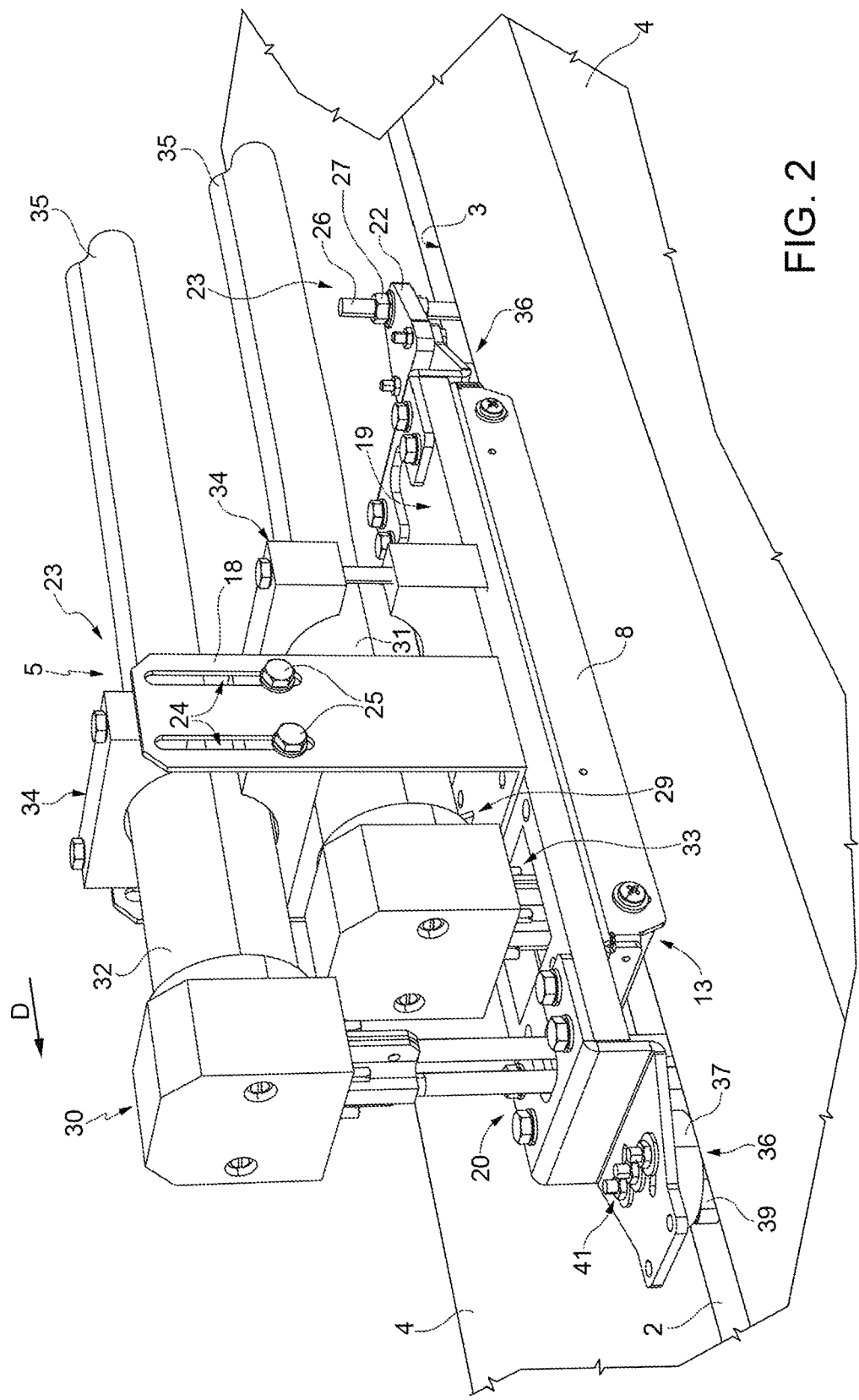
FIG. 2 illustrates a perspective view of the front three quarters of the pre-heating head in FIG. 1 while pre-heating the two edges of plates which are adjacent to each other.
Figure 4:
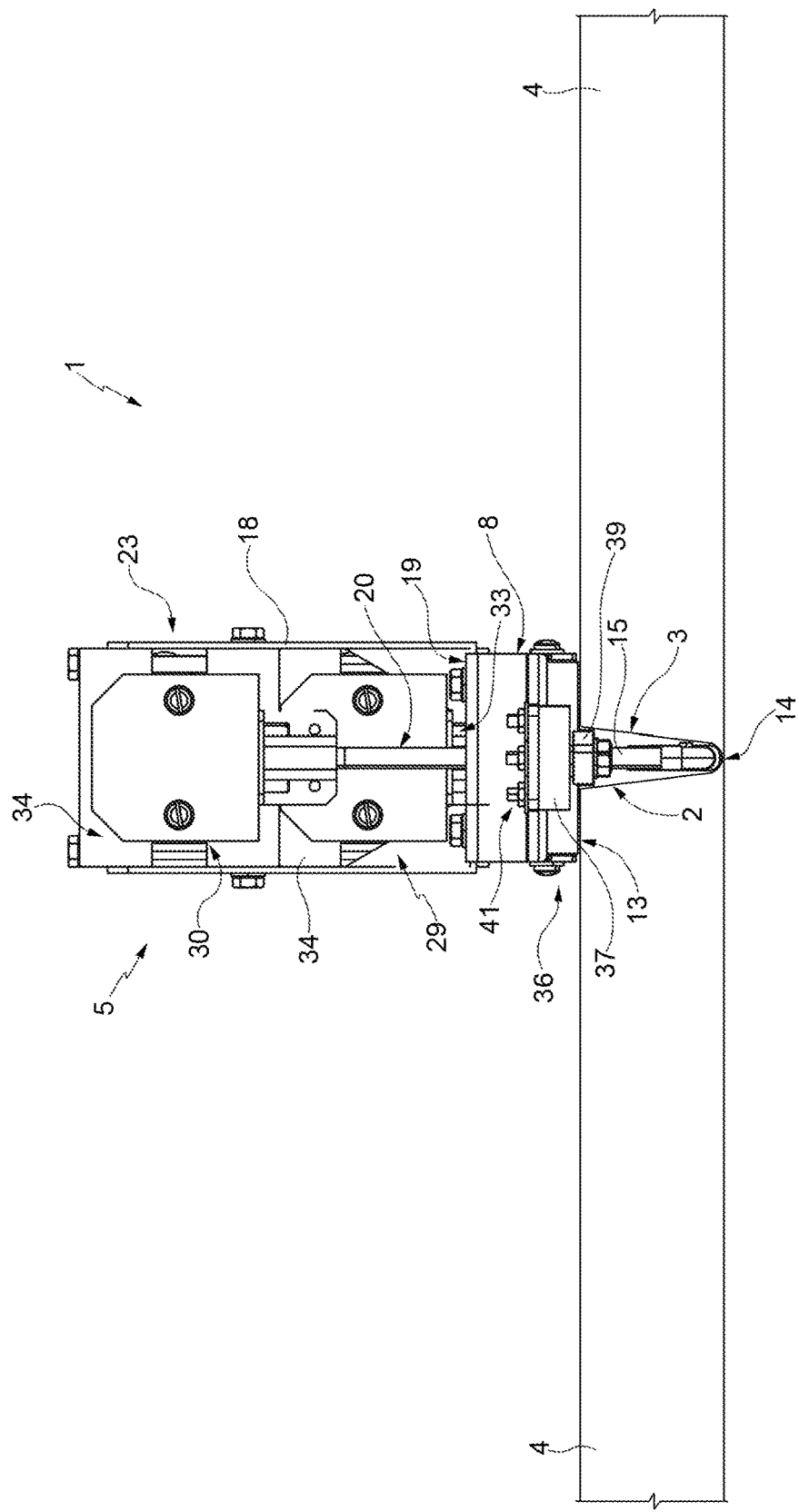

FIG. 4 illustrates a transverse view of the device in FIG. 3 in elevation from the pre-heating head in FIG. 2.

With reference to FIGS. 1 to 4, a device for the induction pre-heating and butt welding of the adjacent edges 2, 3 which have to be joined of at least one item 4 which has to be welded (for example two plates 4 which have to be joined together or plates defined by the opposite longitudinal extremities of a single plate bent into a tubular shape) is indicated as a whole by 1.

Device 1 comprises an induction pre-heating head 5 for adjacent edges 2, 3 and a welding head 6 arranged in tandem with respect to the pre-heating head immediately downstream from the pre-heating head in relation to a welding direction D indicated by an arrow in FIGS. 2 and 3 along which pre-heating head 5 and welding head 6 move along a welding path when in use in a manner which is known, as for example described in US2011/0284527.

Welding head 6 is indicated merely diagrammatically by means of a block and may comprise any known welding head suitable for the purpose, for example a welding torch or electrical wire, for example of the TIG or similar type. In any event this is located downstream from pre-heating head 5 in direction D and is supported as an integral part by pre-heating head 5, for example through a common supporting structure 7 (FIG. 3), which is also only illustrated diagrammatically in that it is obvious to those skilled in the art, for example supported by suitable means for moving heads 5 and 6 along direction D.

Pre-heating head 5 comprises in combination a sliding-block-shaped supporting structure 8 which when in use can move over edges 2, 3 which have to be welded, parallel to them, and a first inductor 9 (FIG. 1) which is defined at least in part by a first tube 10 housed within sliding block supporting structure 8.

Tube 10, and with it entire inductor 9, is U-shaped in a first plane, this first plane being parallel to a plane containing/passing through edges 2, 3 which have to be welded, in such a way that the aforesaid first plane which coincides with a plane perpendicular to the plane of the page in Figure comprises the plane in which inductor 9, U-shaped folded tube 10 and sliding block supporting structure 8 lie.

Inductor 9 is also supported as an integral part by supporting structure 8 in such a way that a first branch 11 and second branch 12 respectively of tube 10 are located each above one of the edges which have to be welded when in use, above edges 2 and 3 respectively in the example illustrated, at a predetermined distance from the edges which have to be welded.

In the example illustrated, supporting structure 8 defines a box-shaped body which is open on at least one first face 13 which in use faces at least one item 4 which has to be welded and the adjacent edges 2, 3 and inductor 9 is housed within the thickness of supporting structure 8 on the side of first face 13 in such a way that it is open towards edges 2, 3 of sliding block supporting structure 8.

Figure 1:
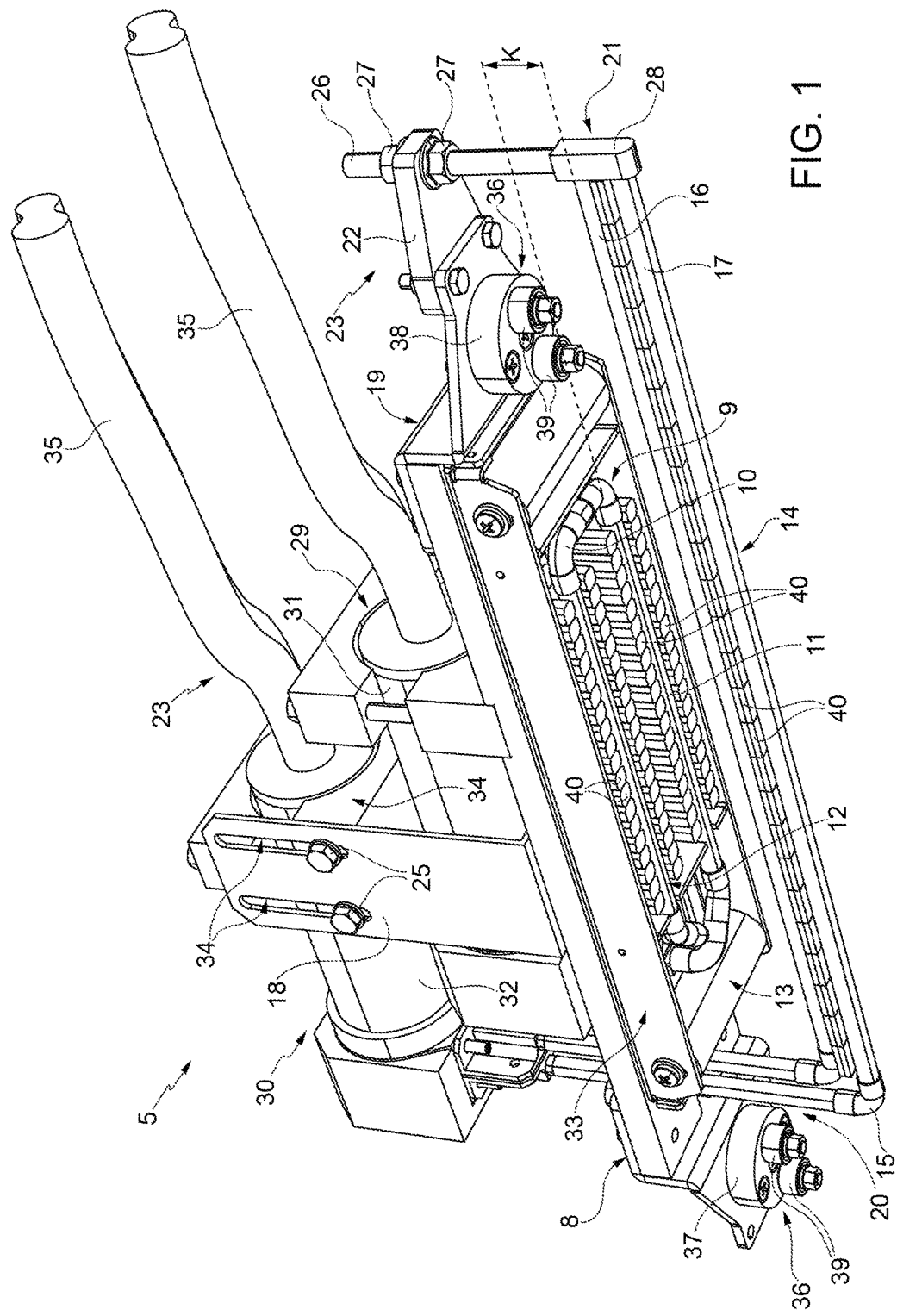
FIG. 1 illustrates a perspective view from beneath of three quarters of an induction pre-heating head for the adjacent edges of at least one mechanical item which have to be joined by welding according to the invention.

According to one aspect of the invention, in combination with what has been described above, pre-heating head 5 also comprises a second inductor 14 (FIGS. 1 and 4) at least partly defined by a second tube 15; inductor 14, and with that tube 15, is U-shaped in a second plane which is perpendicular to the said first plane parallel to which inductor 9 lies; inductor 14 therefore lies parallel to the plane of the page in FIG. 3 and still according to the invention is supported as an integral part by supporting structure 8 in such a way that a first branch 16 and a second branch 17 respectively of tube 15 are when in use placed between edges 2, 3 which have to be welded (FIG. 4), in a direction perpendicular to the welding direction D; in addition to this inductor 14 is located at a predetermined distance K from inductor 9 (FIG. 1).

Inductors 9 and 14 are supported by sliding block supporting structure 8, both on face 13; and second inductor 14 is cantilevered out from face 13 of supporting structure 8 and across supporting structure 8 itself; second inductor 14 is also supported by a first bracket 18 supported by a second face 19 of supporting structure 8 opposite first face 13.

Overall, second inductor 14 is in the shape of a blade: its first extremity 20 is defined by the L-shape folded terminal extremities of tube 15 connected to branches 16 and of inductor 14 which are arranged above and parallel to each other at a predetermined distance from each other in a direction parallel to a common plane in which both lie which coincides with the plane in which entire inductor 14 lies, the plane being perpendicular to the plane in which inductor 9 and face 13 lie; this extremity 14 passes through sliding block supporting structure 8.

A second extremity 21 of inductor 14 opposite extremity 20 is supported by a second bracket 22 which is supported as an integral part and longitudinally cantilevered out from supporting structure 8 on the side opposite first extremity 20 of second inductor 14, which according to a further aspect of the invention extends over a greater length in welding direction D than first inductor 9.

According to another aspect of the invention inductor 14 is supported by supporting structure 8 in such a way that it can move in a direction perpendicular to the aforesaid first plane in which the entire extent of inductor 9 lies and can move perpendicularly to face 13, which is generally flat; also according to another aspect of the invention device 1, or head thereof, comprises means for adjusting the predetermined distance K from the first inductor, indicated as a whole by reference number 23.

In the non-restrictive embodiment illustrated, adjustment means 23 comprise slots 24 made perpendicular in faces 13 and 19 through the side walls of bracket 18 and removably engaged by immobilising bolts 25 which are of one piece with extremity 20 of inductor 14, and an incorporated threaded rod 26 passing through bracket 22 perpendicularly thereto and to faces 13 and 19 and provided with two immobilising bolts 27 on bracket 22; rod 26 is fixedly attached to end 21 of inductor 14, for example by an electrically conducting block 28 which is welded as an integral part to rod 26. Bracket 22 is instead made of an electrically insulating material.

In particular both inductors 9 and 14 are provided with corresponding electrical power converters 29 and 30 which are independent of each other and are supported directly on face of supporting structure 8. Inductors 9 and 14 are also cantilevered out on respective cylindrically-shaped bodies 31 and 32 of converters 29, 30, these bodies 31, 32 being supported as an integral part by supporting structure 8. In the embodiment illustrated inductor 9 also ends at extremity 20 of inductor 14 with its extremity 33 in an L-shape thanks to suitable folding of the terminal extremities of its tube 10 in a manner similar to that of the extremities of tube 15. These extremities 20 and 33 are cantilevered out as an integral part by respective converters 30 and 29 and corresponding bodies 32 and 31 in such a way that they extend towards face 19 (and across faces 19 and 13 in the case of extremity 20) while the rest of inductors 9 and 14 then extend from extremities 33 and 20 parallel to direction D and the longitudinal extension of bodies 31 and 32, which are supported and immobilised on face 19 of supporting structure 8 by respective pairs of clamps 34 supported as an integral part by supporting structure 8; clamps 34 which support body 32 and therefore indirectly entire inductor 14 are of one piece with bolts 25 and are attached to supporting structure 8 by the latter via rod 18 in such a way as to ensure that inductor 14 is able to engage in the relative movement already described.

Obviously cooling water circulates within tubes 10 and 15 when in use; the water and electrical feeds to inductors 9 and are provided in a known way via multipurpose pipes 35 (FIGS. 1 and 2).

According to another aspect of the invention, second inductor 14 extends over a greater distance in welding direction D than first inductor 9.

According to a further and important aspect of the invention, sliding block supporting structure 8 is also provided with means 36 for centering inductors 9 and 14 with respect to edges 2, 3 which have to be welded, and when in use these are capable of holding inductor 14 equidistant from both edges 2, 3 which have to be welded at all times and inductor 9 is always centred above edges 2, 3 which have to be welded.

These centering means 36 comprise a first and second bush, 37 and 38 respectively, supported on face 13 of supporting structure 8 and upstream and downstream respectively of inductor 14 in welding direction D; bushes 37 and 38 are cantilevered out perpendicularly with respect to face 13 of the side opposite face 19 (and therefore when in use towards edges 2, 3 which have to be pre-heated) and can rotate about respective axes A and B (FIG. 3) perpendicular to the said first plane which includes the plane in which inductor 9 lies. Each bush 37, 38 is provided with a pair of idling rollers 39 on the side opposite supporting structure 8 which when in use can act together from opposite sides with edges 2, 3 which have to be welded.

For this purpose rollers 39 are eccentrically mounted with respect to axes A and B in positions which are diametrically opposite each other and rotating bushes 37, 38 are provided with immobilising nuts 41 to stop rotation in any angular position desired. When in use, once nuts 41 have been released, bushes 37, 38 are rotated until rollers 39 touch edges 2, 3; then rotation is immobilised by tightening nuts 41, thus immobilising bushes 37, 38 in the angular position which they have taken up, thus ensuring that rollers 39 continue to act together with edges 2, 3, thus consequently centering the "blade" defined by inductor 14.

In this way, when inductor 14 is inserted between edges 2, 3 and bushes 37, 38 are caused to rotate manually, rollers 39 contact edges 2, 3 in such a way as to place branches 16, 17 of inductor 14 in a perfectly centred position in the space defined by edges 2, 3 (FIG. 4). At the same time branches 11, 12 of inductor 9 are located so as to "cover" edges 2, 3 and during the operations of pre-heating and the immediately subsequent welding rotate on adjacent edges 2, 3 which have not yet been welded together, keeping both inductors 9 and 14 in the most appropriate position to provide pre-heating.

As inductor 14 can be located in such a way that it enters the space defined between edges 2, 3, the induction pre-heating thereof is uniform and perfectly located over their entire thickness without the dispersion of heat, which when not dangerous is useless.

In order to further improve the performance of inductors 9, 14 and therefore head 5 and device 1 as a whole, at least the first and second branches, 11, 12 and 16, 17 respectively of each inductor 9 and 14 respectively are provided with flow concentrators 40 (FIG. 1) formed of saddle-shaped ferrite elements straddling first tube 10 and flat ferrite elements inserted between branches 16, 17 of second tube 15 respectively.

The invention claimed is:

1. An induction pre-heating and butt welding device for adjacent edges to be joined of at least one element to be welded, of the type comprising an induction pre-heating head of the adjacent edges and a welding head arranged in tandem with respect to the pre-heating head, immediately downstream of the pre-heating head, with respect to a welding direction along which, in use, the pre-heating and welding heads are moved according to a welding trajectory; characterized in that the pre-heating head comprises, in combination:

support structure shaped as a sliding block and adapted to move over the edges to be welded, parallel thereto;
   a first inductor lying in a first plane, which is parallel to a plane containing, or passing through, the edges to be welded, which is integrally supported by the support structure at a predetermined distance from the edges to be welded; and
   a second inductor lying in a second plane, perpendicular to the first plane and integrally supported by the support structure so as to be in use interposed between the edges to be welded and arranged at a predetermined distance from the first inductor.

2. The device of claim 1, wherein the first and second inductors are supported by the sliding-blockshaped support structure on the side of a same first face thereof facing in use the edges to be welded; the first inductor being accommodated within the thickness of the support structure, which defines a box-like body open at least at the first face; and the second inductor being supported so as to protrude from the support structure, on the side of the first face, and through the support structure; the second inductor being supported by a first bracket carried by a second face of the support structure opposite to the first face.

3. The device of claim 1, wherein the first inductor is at least partly defined by a first pipe, is U-shaped in said first plane and is carried by the support structure so that respective first and second branches of the first pipe are each arranged in use over one of the edges to be welded; and the second inductor is at least partly defined by a second pipe, is U-shaped in said second plane and is carried by the support structure so that respective first and second branches of the second pipe are in use interposed between the edges to be welded.

4. The device of claim 3, wherein the second inductor has: a first end defined by L-folded terminal ends of the second pipe connected to the first and second branches of the second inductor and passing through the sliding-block-shaped support structure; and a second end, opposite to the first one, which is supported by a second bracket integrally carried by and protruding from the support structure on the opposite side with respect to the first end of the second inductor.

5. The device of claim 4, wherein the support structure is provided with a centering means with respect to the edges to be welded, adapted to keep the second inductor, in use, constantly equally spaced apart from both edges to be welded and the first inductor constantly centered over the edges to be welded.

6. The device of claim 5, wherein the centering means comprise a first and a second bush, both carried so as to protrude from the support structure on the side of the first face and upstream and downstream of the second inductor, respectively, in the welding direction; the bushes being rotating on respective axes perpendicular to the first plane and each being provided on the side opposite to the support structure with a pair of idling rollers adapted to cooperate on opposite sides with the edges to be welded.

7. The device of claim 3, wherein at least the first and second branches of each inductor are provided with flux concentrators, respectively defined by saddle-shaped ferrite element mounted straddling the first pipe and by flat ferrite elements mounted inserted between the branches of the second pipe.

8. The device of claim 1, wherein the second inductor has a length extension in the welding direction longer than that of the first inductor.

9. The device of claim 1, wherein the second inductor is carried by the support structure movable in a direction perpendicular to the first plane; the device further comprising an adjusting means of the predetermined distance from the first inductor.

10. The device of claim 1, wherein the sliding-block-shaped support structure directly carries a respective independent converter for each inductor on the side of a face thereof opposite to the inductors and to the edges to be welded, the inductors being carried so as to protrude from respective cylindrical bodies of the converters, which bodies are integrally carried by the support structure.

11. An induction pre-heating head for a butt welding device of adjacent edges to be joined of at least one element to be welded, comprising, in combination:
 a support structure shaped as a sliding block and adapted to move over the edges to be welded, parallel thereto;
 a first inductor at least partly defined by a first pipe, the first inductor being U-shaped in a first plane, which is parallel to a plane containing the edges to be welded, and being integrally carried by the support structure so that respective first and second branches of the first pipe are each arranged in use over one of the edges to be welded, at a predetermined distance from the edges to be welded; and
 a second inductor at least partly defined by a second pipe, which second inductor is U-shaped in a second plane, perpendicular to the first plane, and is integrally carried by the support structure so that respective first and second branches of the second pipe are interposed in use between the edges to be welded, arranged at a predetermined distance from the first inductor.

12. An apparatus, comprising:
 an induction head configured to heat adjacent edges to be joined of at least one element to be welded, the induction pre-heating head comprising:
  a sliding support structure configured to move over and parallel to the edges to be joined;
  a first inductor arranged in a first plane, which is parallel to a plane containing, or passing through, the edges to be welded, wherein the first inductor is supported by the sliding support structure at a predetermined distance from the edges to be joined; and
  a second inductor lying in a second plane that is perpendicular to the first plane, wherein the second inductor is integrally supported by the sliding support structure so as to be in use interposed between the edges to be welded and arranged at a predetermined distance from the first inductor.

13. The apparatus as defined in claim 12, further comprising a welding head configured to weld the edges to be joined, wherein the welding head is arranged in tandem with the induction head and immediately downstream of the head with respect to a welding direction, wherein the induction head and the welding head are configured to be moved according to a welding trajectory.

14. The apparatus as defined in claim 12, wherein the first inductor is configured in a U-shape.

15. The apparatus as defined in claim 12, wherein the second inductor is configured in a U-shape.

16. The apparatus as defined in claim 15, wherein the second inductor is attached to the support structure such that respective first and second branches of the U-shape of the second inductor are interposed in use between the edges to be welded.

17. The apparatus as defined in claim 12, further comprising flow concentrators positioned adjacent at least one of the first inductor or the second inductor.

* * * * *